June 12, 1945.   E. H. PIRON   2,378,099
COUPLING
Filed Oct. 5, 1943   2 Sheets-Sheet 1
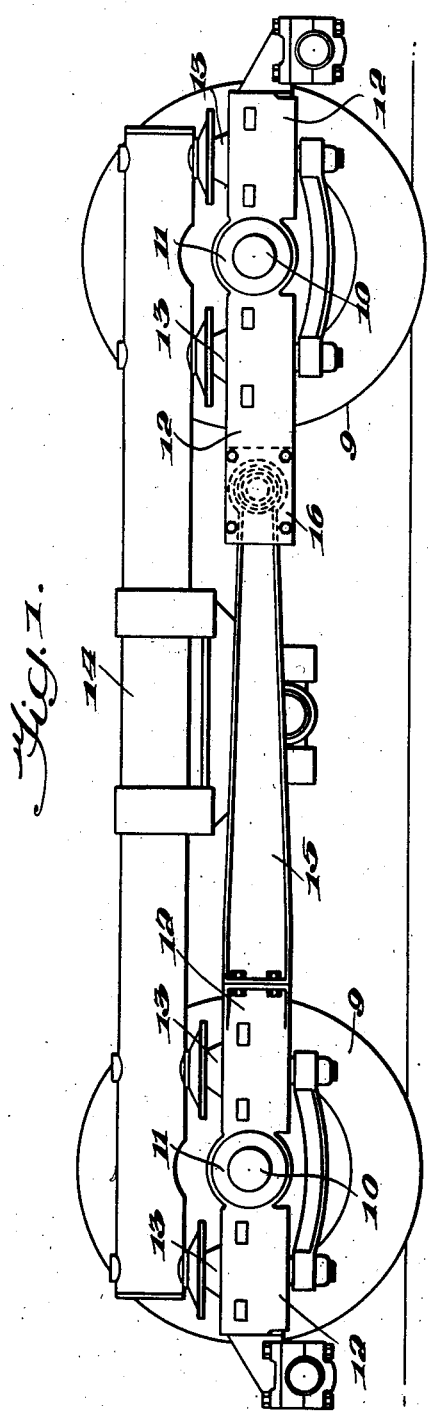
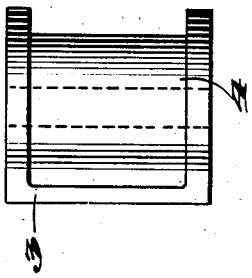
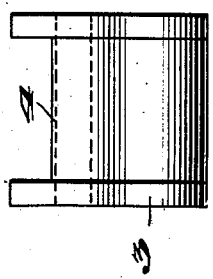
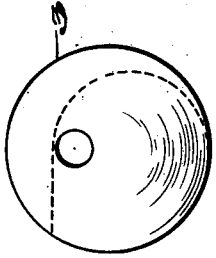
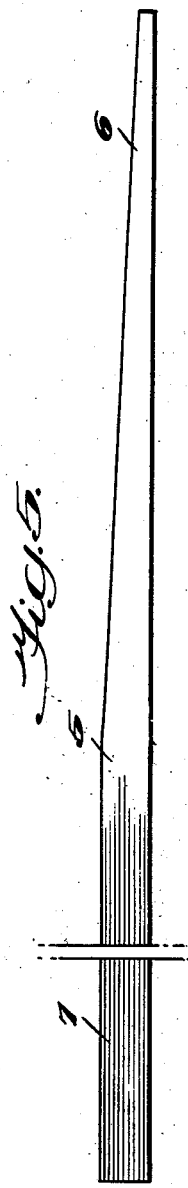
Inventor
EMIL H. PIRON,
By J Windsor Davis
Attorney June 12, 1945.  E. H. PIRON  2,378,099
COUPLING
Filed Oct. 5, 1943  2 Sheets-Sheet 2

Inventor
EMIL H. PIRON
By Windsor Davis
Attorney

Patented June 12, 1945

2,378,099

UNITED STATES PATENT OFFICE 2,378,099

COUPLING

Emil H. Piron, New York, N. Y., assignor to Transit Research Corporation, New York, N. Y., a corporation of New York Application October 5, 1943, Serial No. 505,078

3 Claims. (Cl. 287—86)

This invention relates to couplings for insertion between two members between which limited and resilient relative movements are desired. The principal object is to provide a coupling made entirely of metal and capable of permitting relative movement between two of its parts substantially equal in every direction, and under heavy loading.

In certain street car trucks now in use and as illustrated in my Patent No. 2,137,543 issued November 22, 1938, a torque arm connects the journal bearings on the same side of the truck. These torque arms are articulated at a point closer to one journal than the other by means of a rubber coupling. In order to conserve rubber it is the present problem to provide a coupling which will give resiliency at this point in the torque arm in a manner generally comparable to that provided by rubber.

More particularly it is the object of this invention to provide a coupling composed essentially of an open ring member, a pin centrally through and substantially smaller in diameter than the inside of said ring member and a spiral spring member connecting said ring member and pin, the spring member being so attached and so proportioned as to provide substantially equal elastic resistance to relative fore and aft, lateral and vertical movements and to twisting movements between the ring member and the pin.

Figure 7:
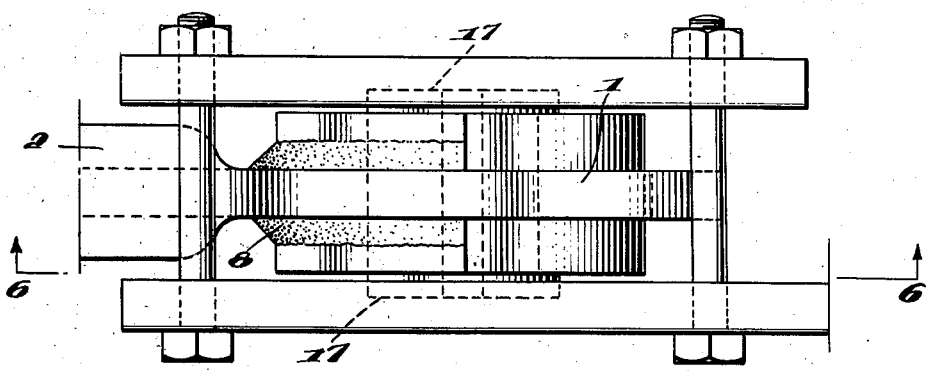
Figure 6:
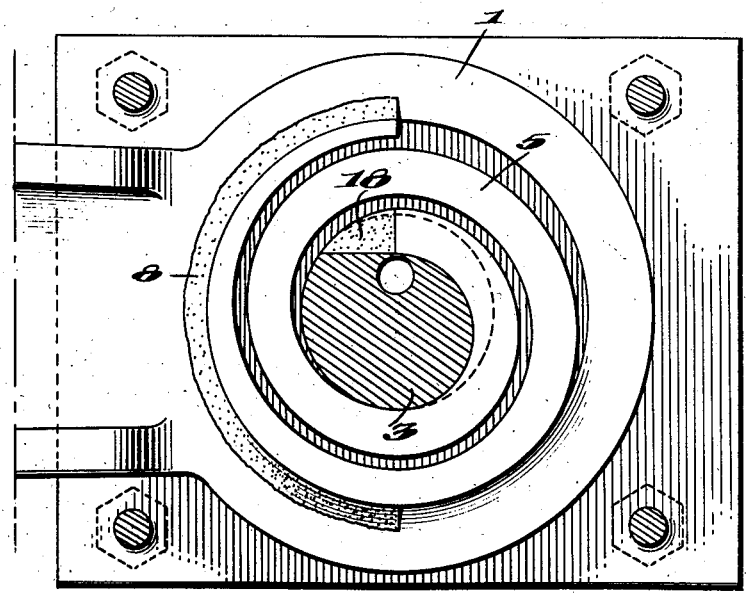

Other objects and advantages will become hereinafter more fully apparent as reference is had to the accompanying drawings in which my invention is illustrated and in which Figure 1 is a side elevation of a rail truck equipped with torque arms articulated along their length by means of my improved coupling, Figure 2 is an end elevation of the central or pin member of my coupling, Figure 3 is a side elevation of the central or pin member when positioned as in Figure 2, Figure 4 is a side elevation of the central or pin member as seen in Figure 3 but in which the top portion is rotated away from the reader, Figure 5 is a top or bottom plan view of the spring element before coiling, Figure 6 is a side elevation of the ring member with the spring element coiled and secured thereto and with the central member also secured to the spring element, the central member having one end removed, and Figure 7 is a top or bottom plan view of the coupling of Figure 6.

Referring first to Figures 6 and 7, 1 indicates one main coupling member in the form of a ring having an extension arm 2 integral therewith. Concentrically within the ring member 1 is a second main coupling member 3 as best illustrated in Figures 2, 3 and 4. This member is cylindrical in form with a tapered groove 4 in the central part of its periphery. The groove 4 has a depth ranging from zero to the thickness of the end of a spiral spring 5 which fits thereinto and which is welded thereto at 18.

The spring 5 is of flat spiral construction wound from a ribbon or strip of metal, as indicated in Figure 5, which tapers in width, being narrowest at the end 6 which is welded to the member 3. The other end 7 tapers in thickness and is welded over its tapered portion to the inside periphery of the ring member 1 at 8 as illustrated in Figures 6 and 7.

One application of my improved coupling where heavy loading may occur radially, laterally and torsionally, is illustrated in Figure 1 in which 9 refers to rail wheels mounted on axles 10, the axles extending through journal bearings 11. Spring supporting saddles house the journal bearings, the saddles each being integral with spring receiving pots 12 having springs 13 therein. The main frame side members 14 are carried by the springs 13. Extending forwardly from one spring pot 12 and rearwardly from another spring pot 12 on the same side of the truck are two parts 15 and 16 which are connected at 17 by my improved coupling. This truck is fully illustrated and described in my Patent #2,137,543 previously mentioned.

What I claim is:

1. A coupling comprising a ring member, a flat spiral spring tapered in thickness toward one end and integrally secured to said ring member along the entire length of its tapered portion, and a central member concentric within said ring member to which the other end of said spring is attached.

2. A coupling comprising a ring member, a central member within said ring member and a flat spiral spring connecting said members, said central member being circular at each end and having a diametric cross-section intermediate its ends which is semi-circular over half its periphery and which gradually decreases in radius over the other half of its periphery to a final depth equal to the thickness of an end of said spiral spring, said spiral spring being welded to said central member at its region of smallest radius.

3. A coupling comprising a ring member, a central member within said ring member and a flat spiral spring connecting said members, said central member having a circumferential groove intermediate its ends which tapers in depth from zero to the thickness of said spring and which has a width equal to that of said spring, said spring fitting into said groove and being welded thereto at its adjacent end, said spring tapering in width toward said adjacent end and tapering in thickness towards its other end, said other end being welded along both edges of its taper to said ring member.

EMIL H. PIRON.